(No Model.)
M. W. ILES.
PROCESS OF RECOVERING METAL FROM SLAG.
No. 515,082.  Patented Feb. 20, 1894.
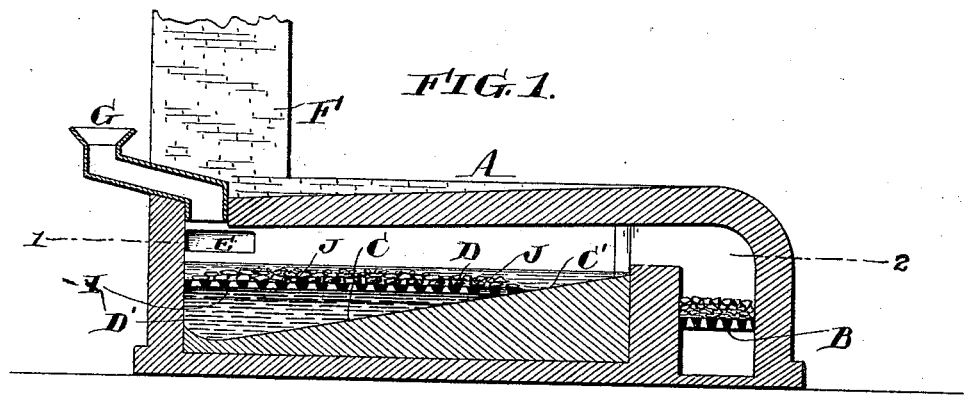
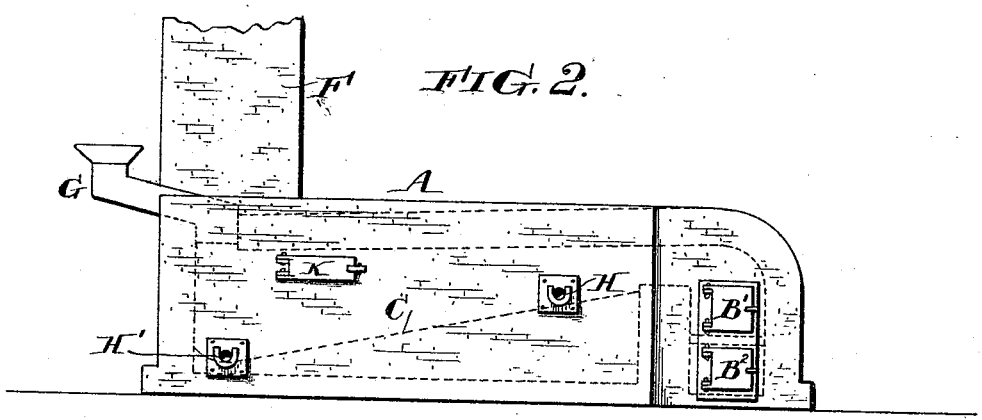
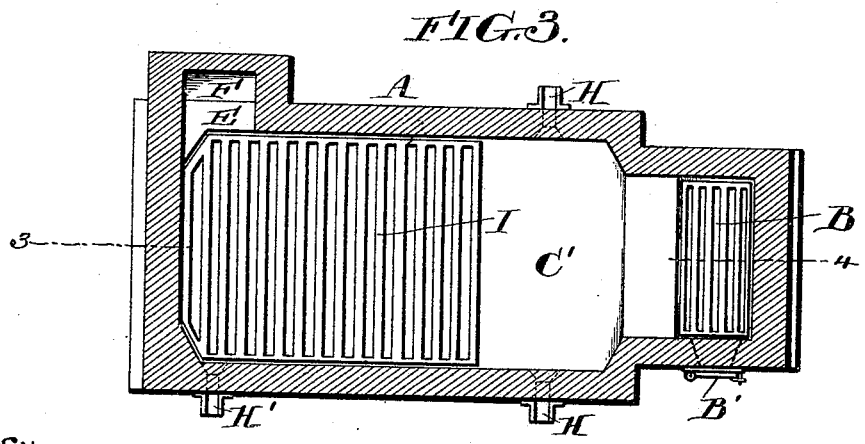
Witnesses:
Henry Drury
J. H. Russell
Inventor:
Malvern W. Iles
by his atty.
Francis T. Chambers

UNITED STATES PATENT OFFICE.

MALVERN W. ILES, OF DENVER, COLORADO.

PROCESS OF RECOVERING METAL FROM SLAG.

SPECIFICATION forming part of Letters Patent No. 515,082, dated February 20, 1894.

Application filed February 10, 1892. Serial No. 420,932. (No specimens.)

*To all whom it may concern:*

Be it known that I, MALVERN W. ILES, of the city of Denver, county of Arapahoe, State of Colorado, have invented a certain new and useful Improvement in Processes of Recovering Metals from Slag, of which the following is a true and exact description, reference being had to the accompanying drawings, which form a part of this specification.

My invention relates to the treatment of slags from furnaces, particularly argentiferous smelters, and has for its object to enable the valuable metallic particles suspended in the slag to be more completely drained from it, so to speak, than has heretofore been practical. In patents granted to me on the 4th of April, 1893, and numbered 494,570 and 494,571 I have described the treatment of the slag in large masses, and by the aid of furnaces to maintain it at a high temperature and quiescent state so as to secure a larger portion of the contained matte by subsidence, and my present invention is best applied under similar circumstances, and as an adjunct to the separation of slag and matte by subsidence.

My invention, consists in subjecting the highly heated slag to the action of iron scrap immersed in the upper layers of the slag above the level of the accumulated matte in order to reduce the salts and oxides of lead, silver and copper, since iron at a red heat immersed in slag will decompose the salts of lead, silver and copper contained therein as matte prills, and cause the precipitation of the metals. Thus iron will decompose readily the silicates, sulphides and sulphates of lead, and the metallic lead thus liberated will gather up the silver in the slag forming an alloy which will be found at the bottom of the receptacle below the subsided matte. The salts of silver are reduced in the same way as those of lead, and the copper salts, when present. The chemical reaction taking place may be represented as follows:

$$PbS + Fe = FeS + Pb$$
$$Ag_2S + Fe = FeS + Ag$$
$$Cu_2O.SiO_2 + Fe = FeOSiO_2 + Cu_2.$$

The process is most efficient as the temperature increases, and the slag and iron should be at the temperature of a bright red for the iron.

Reference is now had to the accompanying drawings which illustrate a furnace fitted for the practice of my invention, and in which—

Figure 1 is a central longitudinal section on the line 3—4 of Fig. 3. Fig. 2 is a side elevation, and Fig. 3 a ground plan on line 1—2 of Fig. 1.

A is a reverberatory furnace heated by a fire in furnace B, of which B' and B² are the fire and ash doors. The bottom C of the furnace is sloping so that the matte D' will collect in the deepest part, while the slag D will be widely spread out, so to speak, in the upper part of the furnace.

E is the smoke exit leading to a stack F.

G is a conventional representation of a spout leading into the furnace, and through which the slag is poured into it.

H H are slag taps, and H' is a matte tap.

I represents a grating or cradle set so as to support a layer of iron scrap J in the upper layers of the slag.

The hot slag from the smelter is poured or charged into the furnace and the iron scrap introduced, the furnace is raised or maintained to such a heat as will cause the iron to reduce the metallic salts, and the slag tapped off from the top from time to time. The matte particles of course tend to subside and collect in the bottom of the furnace as shown at D' and the smaller particles of matte which remain in the slag come in contact with the iron and are reduced, their metallic contents being precipitated as an alloy of lead and silver or of lead, copper, and silver. This alloy and the matte are tapped off from time to time through tap H'. It is obviously desirable that the scrap should be maintained above the matte level and it may rest on the bottom C of the furnace at C' or on a cradle I or any convenient support. By arranging the spout G through which the mixed matte and slag is charged into the furnace, over the deepest part thereof, it will be noticed that the matte and slag will be thrown down under the scrap iron supported on the cradle I, or behind the iron scrap if it is placed on the bottom of the furnace as at the point C', so that the slag with any particles of matte carried thereby will be compelled to pass through the iron in rising to the level of the slag in the furnace, also by placing the slag outlet at the opposite end of the furnace from the inlet G and near the upper part of the furnace it is assured that all the material run off therethrough will have been subject to the effect of the iron scrap.

Having now described my invention, what I claim as new, and desire to secure by Letters Patent, is—

The described process of recovering metals from slag consisting in maintaining the slag in a highly heated state, and immersing iron scrap in the upper layers of the slag above the level of accumulated matte so as to reduce the metallic salts and oxides.

MALVERN W. ILES.

Witnesses:
A. CHANUTE,
C. T. DYE.